US008648880B2

(12) United States Patent
Namba

(10) Patent No.: US 8,648,880 B2
(45) Date of Patent: Feb. 11, 2014

(54) TERMINAL DEVICE, DISPLAY METHOD, AND APPLICATION COMPUTER PROGRAM PRODUCT

(75) Inventor: Hiroyuki Namba, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 364 days.

(21) Appl. No.: 13/022,941

(22) Filed: Feb. 8, 2011

(65) Prior Publication Data

US 2011/0298826 A1 Dec. 8, 2011

Related U.S. Application Data

(60) Provisional application No. 61/350,952, filed on Jun. 3, 2010.

(51) Int. Cl.
*G09G 5/00* (2006.01)
*G06F 3/041* (2006.01)

(52) U.S. Cl.
USPC ............................ 345/635; 345/173; 345/619

(58) Field of Classification Search
None
See application file for complete search history.

(56) References Cited

U.S. PATENT DOCUMENTS

| 7,748,634 | B1 * | 7/2010 | Zehr et al. | 235/492 |
| 2009/0315869 | A1 * | 12/2009 | Sugihara et al. | 345/204 |
| 2010/0277443 | A1 * | 11/2010 | Yamazaki et al. | 345/204 |

FOREIGN PATENT DOCUMENTS

JP 2009-251273 A 10/2009

* cited by examiner

*Primary Examiner* — Kee M Tung
*Assistant Examiner* — Leon T Cain, II
(74) *Attorney, Agent, or Firm* — Oblon, Spivak, McClelland, Maier & Neustadt, L.L.P.

(57) ABSTRACT

A terminal device includes a display unit having at least a first display area and a second display area, a detection unit configured to detect a viewing state in which the first display area and/or the second display area are being viewed, and a control unit configured to, when a predetermined application is executed, perform control on the basis of the viewing state detected by the detection unit, for switching between a state in which display is performed on either one of the first display area and the second display area and display is not performed on the other one of the first display area and the second display area and a state in which display is performed on both the first display area and the second display area. A method and computer program storage device holding computer readable instructions cooperate to form a system that performs these functions.

20 Claims, 7 Drawing Sheets

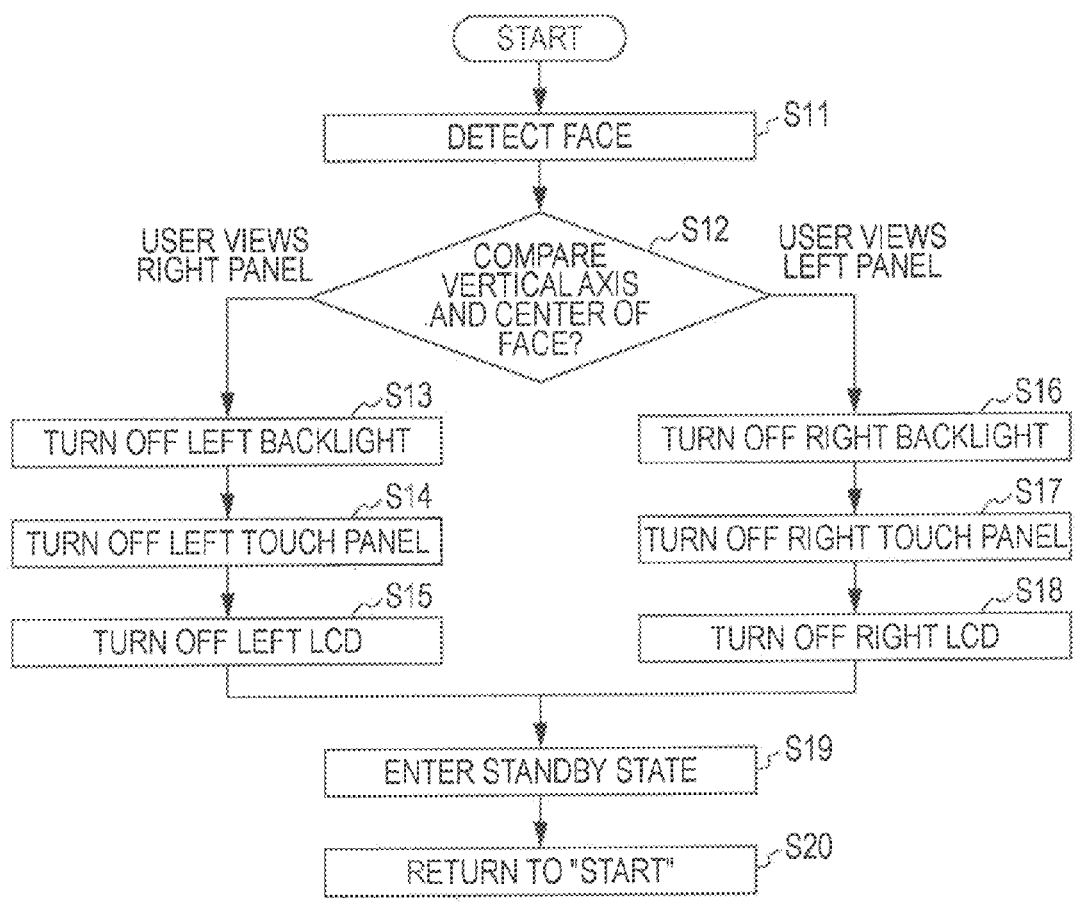

FRAME

LIGHTING STATE OF LCD

FRAME

LIGHTING STATE OF LCD

FRAME

LIGHTING STATE OF LCD

USER VIEWS BOTH PAGES

USER VIEWS PAGE 1

USER VIEWS PAGE 2

TERMINAL DEVICE, DISPLAY METHOD, AND APPLICATION COMPUTER PROGRAM PRODUCT

CROSS REFERENCE TO RELATED PATENT APPLICATION

The present application claims the benefit of the earlier filing date of U.S. provisional patent application Ser. No. 61/350,952, filed in the USPTO on Jun. 3, 2010, the entire contents of which being incorporated herein by reference.

BACKGROUND

1. Field of the Invention

The present invention relates to a terminal device and a display method to be applied to, for example, a terminal device having a display unit including two display areas. The present invention also relates to an application program to be executed in the terminal device.

2. Description of the Related Art

Various terminal devices, such as a mobile phone terminal device, an electronic book terminal device, and a mobile game device, which have two display units have been proposed and are in practical use.

Two display units allow a terminal device to provide various forms of display and satisfactory display quality. For example, using two display units, an electronic book terminal device can display two pages in a book, which improves operability allowing a user to view the electronic book in the same way as viewing a printed book.

Japanese Unexamined Patent Application Publication No. 2009-251273 discusses a computer device having a multi-display in which images are displayed on a plurality of displays in a color tone that can save power consumption.

SUMMARY

In fabricating a terminal device having two display units, a large amount of electrical power is necessary to display images on the two display units, and as a result power consumption of the terminal device may increase. In particular, since, in general, such a terminal device runs on a built-in battery, multiple display panels may shorten the working time of the battery.

The present invention has been made in view of the above circumstances, as recognized by the present inventors. Accordingly, it is desirable to both improve operability given by multiple display units and prevent an increase in power consumption.

Aspects of the present invention may be applied to a terminal device having a display unit provided with at least a first display area and a second display area and a detection unit configured to detect a viewing state in which the first display area and/or the second display area are being viewed.

When a predetermined application is executed, control is performed on the basis of the viewing state detected by the detection unit, for switching between a state in which display is performed on either one of the first and second display areas and display is not performed on the other one of the first and second display areas and a state in which display is performed on both the first and second display areas.

According to an embodiment of the present invention, when the user views only one of the two display areas, display is performed on only the display area viewed by the user and display on the other display area is temporarily discontinued. When the user views both the two display areas to the same degree, display is simultaneously performed on both the display areas.

According to an embodiment of the present invention, when a user views only one of two display areas, display is performed on the display area viewed by the user. At this time, display is not performed on the other one of the display areas and thus electric power necessary for display can be reduced. When the user views both the two display areas to the same degree, display is performed on both the display areas. This can allow the user to view two displayed images when it is necessary to compare the images and realizes efficient reduction of power consumption without causing the user inconvenience.

BRIEF DESCRIPTION OF THE DRAWINGS

FIG. 4 is a flowchart illustrating a procedure of control operation according to an embodiment of the present invention;

DESCRIPTION OF THE PREFERRED EMBODIMENT

An embodiment of the present invention will be described in the following order.

1. description of terminal device (FIG. 1 to FIG. 3)
2. description of control of display change (FIG. 4 to FIG. 8B)
3. description of first modification (FIG. 9)
4. description of second modification (FIGS. 10A and 103)
5. other modifications

[1. Description of Terminal Device]

Figure 1:
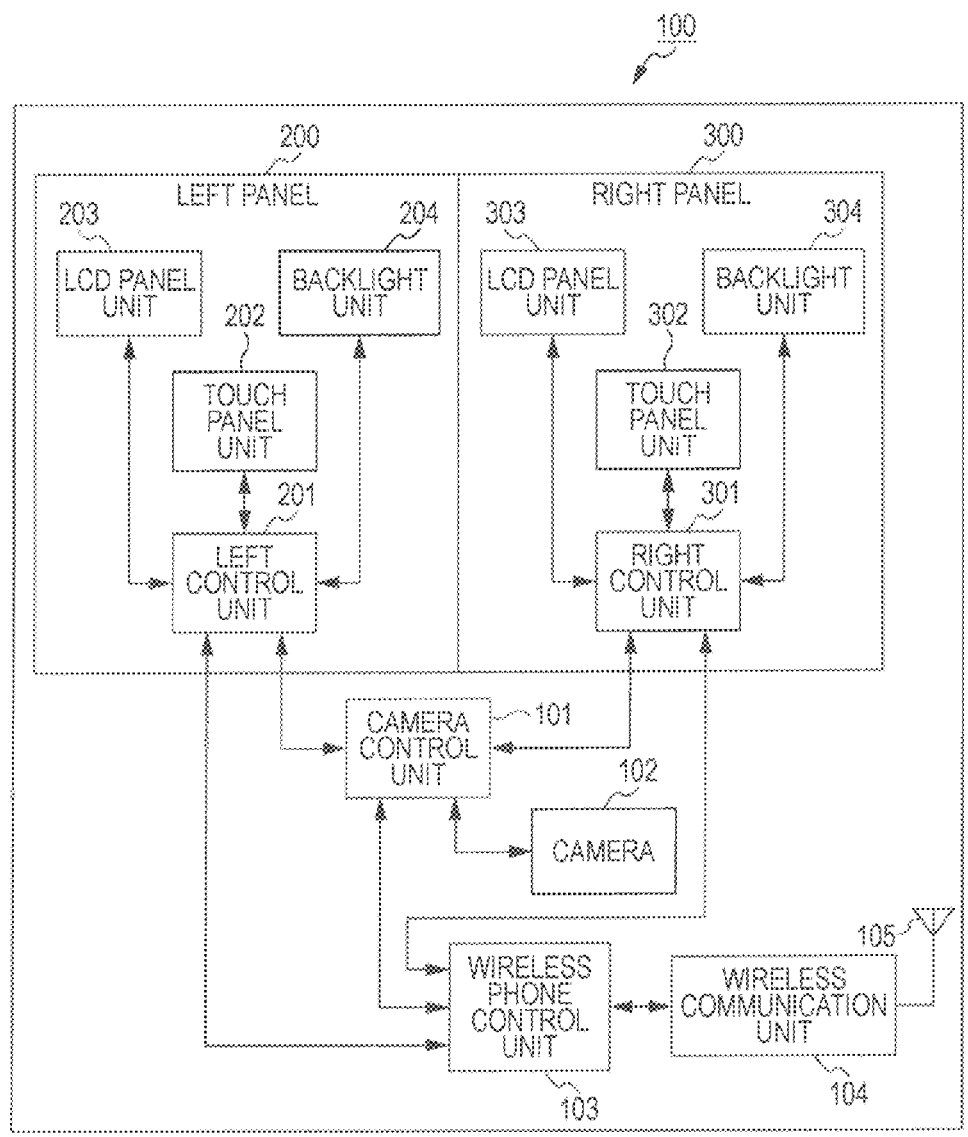
FIG. 1 is a block diagram illustrating an example of a configuration according to an embodiment of the present invention.
Figure 2:
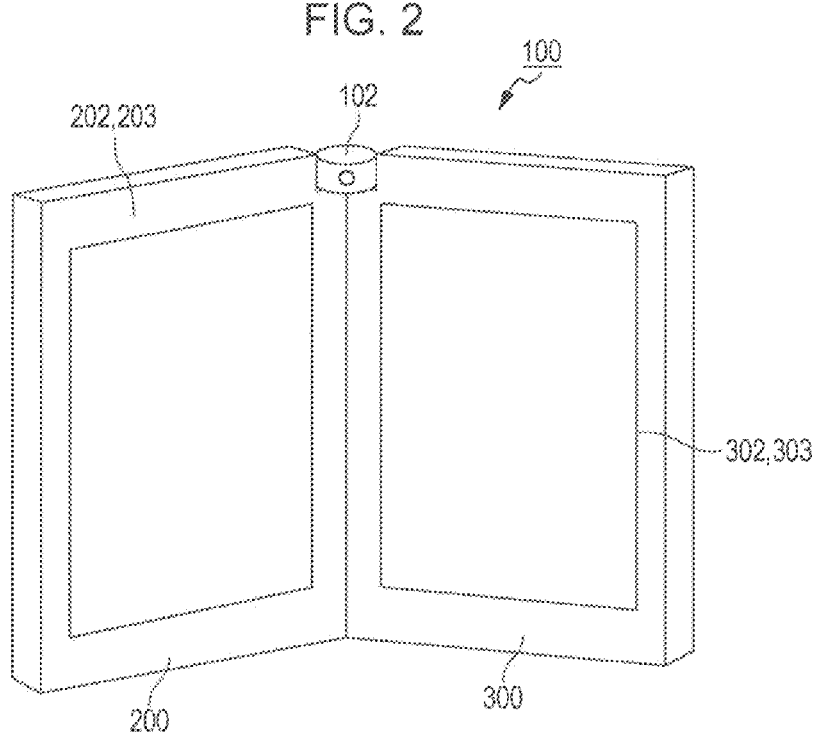
FIG. 2 is a perspective view illustrating an example of an appearance of a terminal device according to an embodiment of the present invention.

FIG. 1 illustrates an example of a configuration of a terminal device 100 according to an embodiment of the present invention. FIG. 2 illustrates an example of an appearance of the terminal device 100.

As illustrated in FIG. 2, the terminal device 100 includes a left panel 200 and a right panel 300 composed of two casings which can be folded together. The terminal device 100 also has a camera 102 disposed at the fold between the left panel 200 and the right panel 300. The camera 102 picks up an image of a user facing the display panels. In the present embodiment, the camera 102 (or other type of sensor such as an image detector) is used to detect a state in which the user is viewing the display panels.

Referring to FIG. 1, the terminal device 100 has the left panel 200 and the right panel 300.

The left panel 200 has a left control unit 201, a touch panel unit 202, a liquid crystal display (LCD) panel unit 203, and a backlight unit 204. An image is displayed on the liquid crystal display panel unit 203 under the control of the left control unit 201. At this time, control for turning on the backlight unit 204 is also performed. The touch panel unit 202 detects contact by a finger or the like on the surface of the liquid crystal display panel unit 203.

The right panel 300 has a right control unit 301, a touch panel unit 302, a liquid crystal display panel unit 303, and a backlight unit 304. An image is displayed on the liquid crystal display panel unit 303 under the control of the right control unit 301. At this time, control for turning on the backlight unit 304 is also performed. The touch panel 302 detects contact by a finger or the like on the surface of the liquid crystal display panel unit 303.

The terminal device 100 has the camera 102 and a camera control unit 101 which controls imaging operation of the camera 102 and performs processing of an image signal obtained through imaging operation. The camera control unit 101 also performs detection of a gaze point of the user and control of display on the basis the detection according to the present embodiment. The camera control unit 101 performs the detection and control by sending a control command to the left control unit 201 and the right control unit 301. When the camera 102 is used as a gaze point detection unit, the camera control unit 101 determines an image obtained by the camera 102 and detects a gaze unit.

The terminal device 100 also has a wireless phone control unit 103, a wireless communication unit 104, and an antenna 105 so as to have a wireless phone function. For example, using the wireless communication unit 104, the terminal device 100 may receive data such as image data and electronic book data to be displayed on the liquid crystal display panel units 203 and 303.

Each of the control units illustrated in FIG. 1 has a memory which stores a program necessary for control, an application program, and the like.

Figure 3:
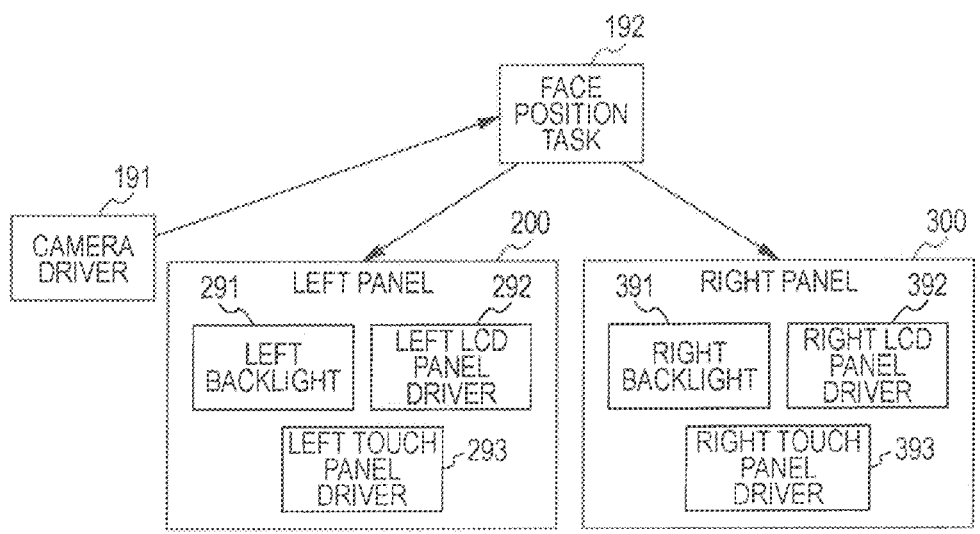
FIG. 3 is a block diagram illustrating a control configuration according to an embodiment of the present invention.

FIG. 3 is a functional block diagram illustrating a configuration for executing software.

A face position task 192 receives an instruction from a camera driver 191 and sends an instruction for controlling display to each of the left panel 200 and the right panel 300. In the present embodiment, the face position task 192 controls backlight by sending an instruction to a left backlight driver 291 and a right backlight driver 391. At the same time, the face position task 192 sends an instruction to each of a left LCD panel driver 292 and a right LCD panel driver 392 to individually control display on the left and right panels. The face position task 192 similarly controls contact detection using a left touch panel driver 293 and a right touch panel driver 393.

[2. Description of Control of Display Change]

In the following, an example of a procedure of a display control processing according to the present embodiment will be described with reference to a flowchart in FIG. 4.

The processing procedure illustrated in FIG. 4 is performed when a predetermined application program is executed. In the processing, the face of a user picked up by the camera 102 (Step S11) is detected and the vertical axis (X axis) of one frame of the picked up image and the center of the face in the picked up image are compared (Step S12). When it is determined that the center of the face of the user deviates from the vertical axis to the right to a predetermined degree or more and that the gaze point is located on the right panel, the processing procedure proceeds to processing of Step S13 to Step S15.

Specifically, the backlight unit 204 of the left panel 200 is turned off (Step S13), the touch panel unit 202 of the left panel 200 is turned off (Step S14), and the liquid crystal display panel unit 203 of the left panel 200 is turned off (Step S15). After a predetermined standby time period elapses, the processing procedure returns to the detection of Step S11 and the following processing is repeated.

If it is determined in the comparison in Step S12 that the position of the face of the user deviates from the vertical axis to the left to a predetermined degree or more and that the gaze point is located on the left panel, the processing procedure proceeds to processing of Step S16 to Step S18.

Specifically, the backlight unit 304 of the right panel 300 is turned off (Step S16), the touch panel unit 302 of the right panel 300 is turned off (Step S17), and the liquid crystal display panel unit 303 of the right panel 300 is turned off (Step S18). After a predetermined standby time period elapses, the processing procedure returns to the detection of Step S11 and the following processing is repeated.

When the processing in the flowchart in FIG. 4 is repeated and display on one of the panels (other than the one that has been turned off) is turned off, the other one is turned on, so that display is performed on either one of the panels. The orders of the processing of Step S13 through Step S15 and the processing of Step S16 through Step S18 illustrated in FIG. 4 are merely examples and may be altered.

Although not illustrated in the flowchart in FIG. 4, when it is determined in the comparison in Step S12 that the face of the user is positioned at substantially the center with respect to the vertical axis and that the gaze point is located at around the center, display is simultaneously performed on both the left panel 200 and the right panel 300. Specifically, the touch panel unit 202, the liquid crystal display panel unit 203, and the backlight unit 204 of the left panel 20 are turned on, and at the same time, the touch panel unit 302, the liquid crystal display panel unit 303, and the backlight unit 304 of the right panel 300 are turned on. After display on both the panels is performed, the processing procedure returns to the standby processing of Step S19 and then returns to the face detection of Step S11.

FIG. 5A to FIG. 7B each illustrate an example of a face detection state and a display state.

Figure 5A:
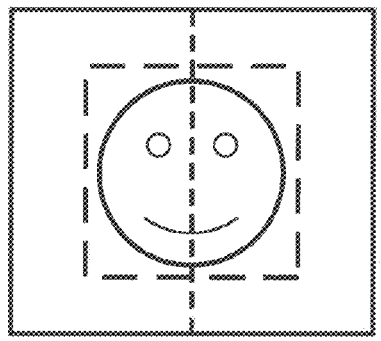
FIGS. 5A and 5B illustrate a first example of a detection state and a display state according to an embodiment of the present invention.
Figure 5B:
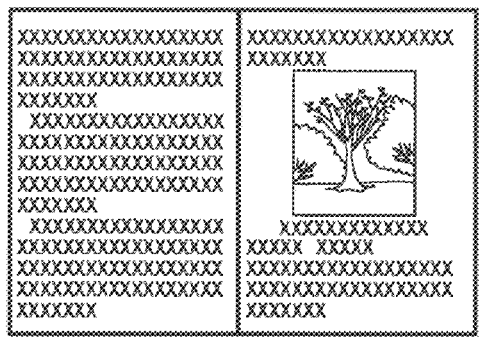

FIGS. 5A and 5B illustrate the case where it is determined that the user's face in a picked up image is positioned at substantially the center and the gaze point is located at around the center. In this example, a single common display panel is used to display one or both pages of reading material, such as a book. Thus, one display panel that is subdivided into two pages may be used, in addition to two separate panels. One example of a common display panel is a table computer. The process for implementing the detection and backlight management may be implemented in the form of a downloadable application.

Specifically, as illustrated in FIG. 5A, when the center of the face is detected at a position around the center between the positions of the two panels, activation screens of the currently activated application are displayed on both the left and right panels as illustrated in FIG. 5B.

Figure 6A:
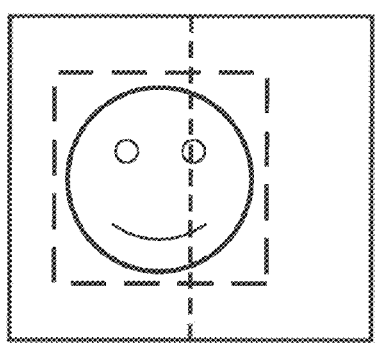
FIGS. 6A and 6B illustrate a second example of a detection state and a display state according to an embodiment of the present invention.
Figure 6B:
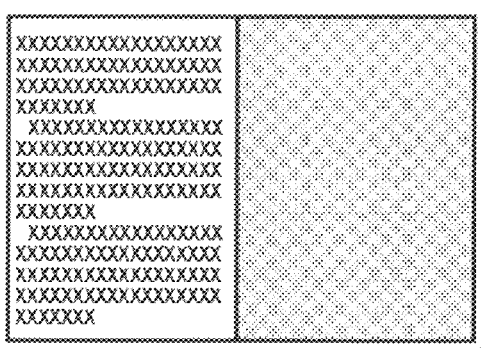

FIGS. 6A and 6B illustrate the case where it is determined that the user's face in a picked up image is deviated to the left and the gaze point is located on the left panel.

Specifically, as illustrated in FIG. 6A, when the center of the face is detected at a position that is deviated to the left from the center between the positions of the two panels, an activation screen of the currently executed application is displayed on the left panel and display on the right panel is discontinued as illustrated in FIG. 6B.

Figure 7A:
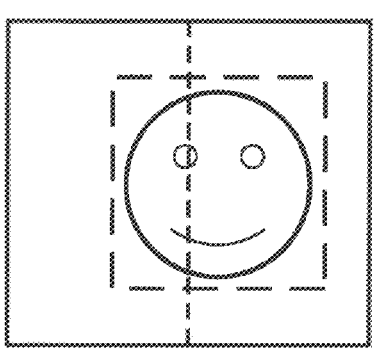
FIGS. 7A and 7B illustrate a third example of a detection state and a display state according to an embodiment of the present invention.
Figure 7B:
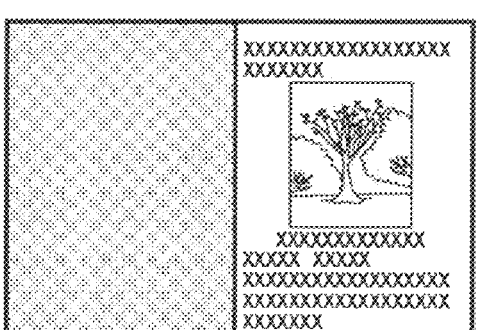

FIGS. 7A and 7B illustrate the case where it is determined that the user's face in a picked up image is deviated to the right and the gaze point is located on the right panel.

Specifically, as illustrated in FIG. 7A, when the center of the face is detected at a position that is deviated to the right from the center between the positions of the two panels, an activation screen of the currently executed application is displayed on the right panel and display on the left panel is discontinued, as illustrated in FIG. 7B.

Figure 8A:
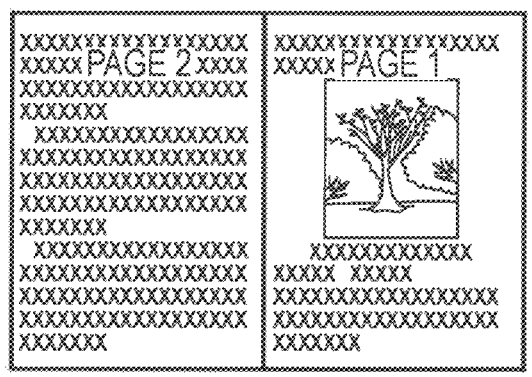
FIGS. 8A to 8C illustrate an example of a change in a display state according to an embodiment of the present invention.
Figure 8B:
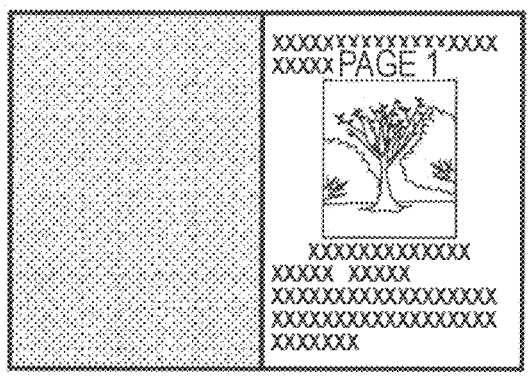
Figure 8C:
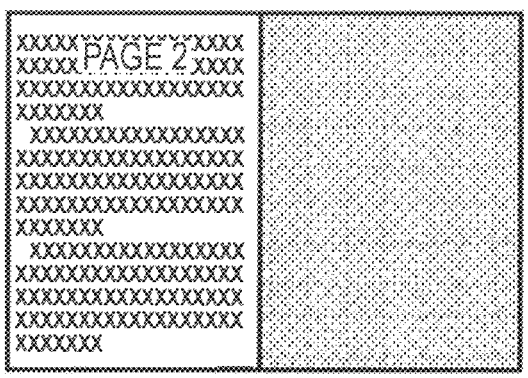

FIGS. 8A to 8C illustrate an example of changes in the display state. For example, the terminal device 100 displays page 1 on the right panel 300 and page 2 on the left panel 200. At this time, when the user views both the pages, both the pages are displayed as illustrated in FIG. 8A.

When the user views only page 1 on the right panel 300, only page 1 on the right is displayed and display of page 2 on the left is discontinued, as illustrated in FIG. 8B. Further, when the user views only page 2 on the left, only page 2 on the left is displayed and display of page 1 on the right is discontinued.

As described above, according to the present embodiment, panels are switched on or off depending on where the user is viewing on two screens, so that the unnecessary panel is turned off. Thus, when the user views the two screens at the same time, the two screens are displayed simultaneously with satisfactory image quality. When the user views only one of the two screens, the corresponding one of the panels is turned on and the other panel is turned off, which reduces power consumption. The simultaneous display on the two panels can immediately be recovered when necessary while one of the panels is off. Therefore, the off-state of one of the panels produces little inconvenience.

In the present embodiment, such a display manner is adapted only when an application program such as an electronic book which allows either one of display panels to be turned off is executed. Thus, switching on or off of display screens is not performed when an application program for comparing images on two display panels is executed, which also causes the user little inconvenience.

[3. Description of First Modification]

In the following, an example of a modification of an embodiment of the present invention will be described with reference to FIG. 9.

In the example of display changes illustrated in FIGS. 8A to 8C, a display panels to be turned off is simply selected. However, in the example illustrated in FIG. 9, a displayed image is changed in accordance with switching of panels to be turned off.

Figure 9:
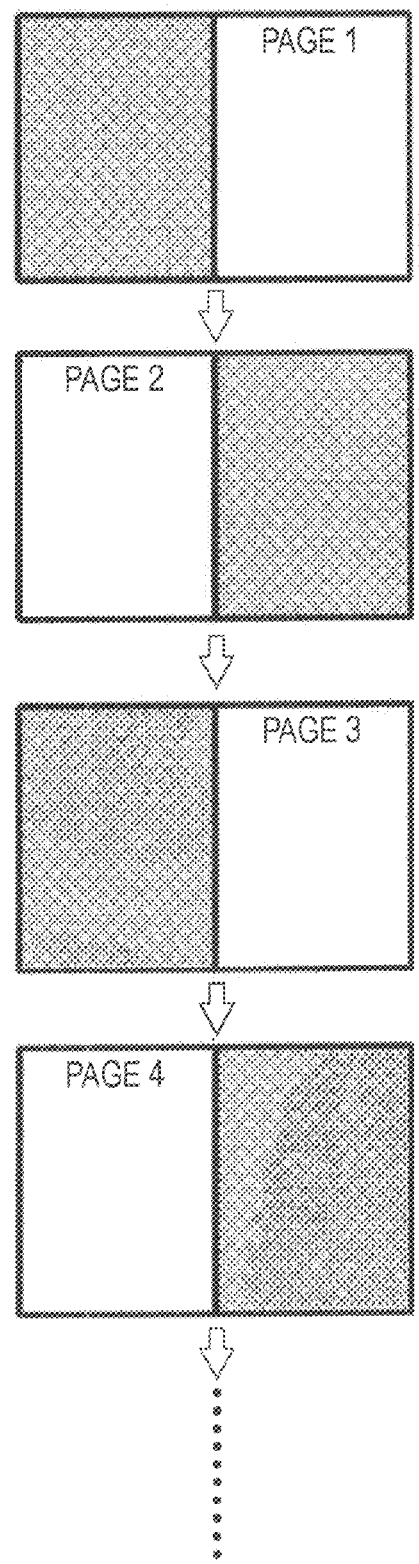
FIG. 9 illustrates an example of a change in a display state according to a modification of an embodiment of the present invention.

Specifically, as illustrated in drawings in FIG. 9, from the top down to the bottom, it is assumed that page 1 is displayed on the right panel in the initial state. Then, when the gaze point is moved to the left, the display state changes to the one illustrated in the second drawing, in which page 2 is displayed on the left panel. This change is the same as has been described using FIGS. 8A to 8C. Further, when the gaze point is moved to the right, the display state changes to the one illustrated in the third drawing, in which page 3 is displayed on the right panel. Thereafter, in accordance with left-right movement of the gaze point, display of pages proceeds to page 4, page 5, and so forth, on a one-page by one-page basis.

Thus, page forwarding can be done on the basis of only the movement of the gaze point of the user, which improves operability. Moreover, the detected gaze point is used to trigger a "page turn" event, in which the system recognizes that the user has finished looking at one page, and wishes to move to a next successive page as indicated by the user turning his or her head to look at the next panel (either left or right panel, depending on whether the left or right page is being viewed).

[4. Description of Second Modification]

Figure 10A:
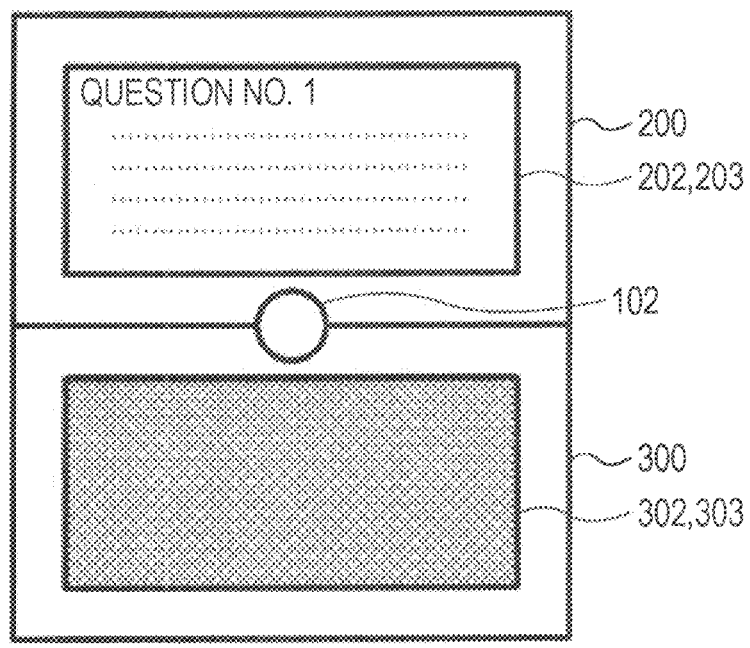
FIGS. 10A and 10B illustrate an example of a change in a display state according to another modification of an embodiment of the present invention.
Figure 10B:
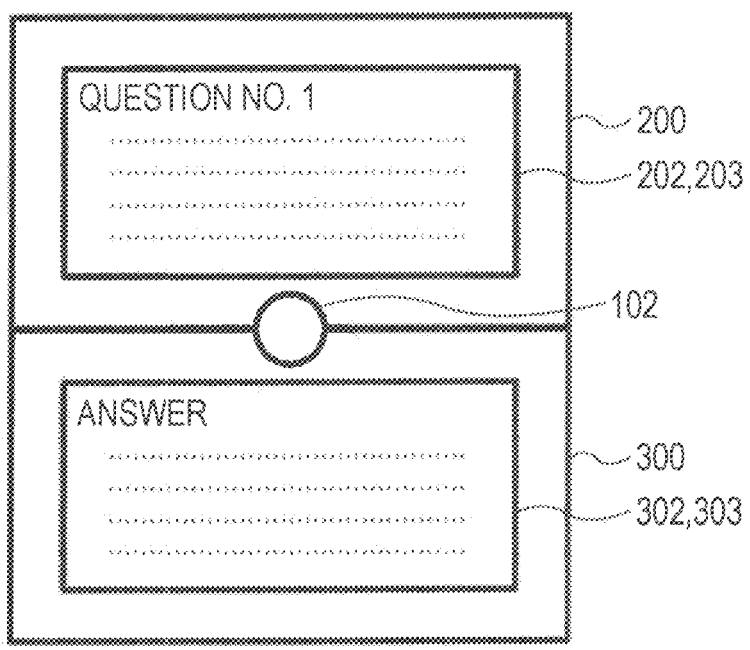

In the following, another modification of an embodiment of the present invention will be described with reference to FIGS. 10A and 10B.

In this example, the orientation of the terminal device 100 in FIG. 2 is changed by 90 degrees, and the left panel 200 is arranged at the top and the right panel 300 is arranged at the bottom. Although the camera 102 is arranged at the center in FIGS. 10A and 10B, the camera 102 may be disposed at an end position as illustrated in FIG. 2. In this example, the ranges of the gaze point of a user to be detected are around the center, at a position higher than the center, and at a position lower than the center.

Using the above arrangement, an application program in which a question and an answer to the question are displayed is to be executed. The user is supposed to view the liquid crystal display panel unit 203 on the top to see the question. As illustrated in FIG. 10A, the liquid crystal display panel unit 303 on the bottom is turned off and displays no images while the question is displayed on the liquid crystal display panel unit 203 on the top.

When the user moves the gaze point to the bottom, display on the liquid crystal display panel unit 303 on the bottom is initiated and the answer to the question is displayed on the liquid crystal display panel unit 303, as illustrated in FIG. 108. At this time, display on the liquid crystal display panel unit 203 is continued so that the question on the top and the answer on the bottom are displayed simultaneously. Alternatively, the liquid crystal display panel unit 203 on the top may be turned off so that the display of the question is discontinued.

In this way, by switching on or off display of questions and answers in accordance with movement of the gaze point of the user, display processing of the application program for displaying questions and answers can be appropriately performed without manual operation of keys, touch panels and the like by the user. Moreover, power can be saved by turning off either one of the panels.

Note that the above application program for displaying questions and answers is described as an example, and this modification example may be applied to any application program in which changing display along with study progress is preferred.

[5. Other Modifications]

In the processing described using the flowchart in FIG. 4, the display panels are turned off to turn off display of images as well as the backlight. However, it is sufficient to turn off the backlight in order to turn off display of images. That is, since a large amount of power is consumed by the backlight in a liquid crystal display panel, only turning off backlight produces a sufficient effect.

Moreover, instead of completely turning off display of images, the images may be displayed in a darker state by reducing the brightness of one of the display panels. To reduce the brightness of the panel, the brightness of the backlight may be reduced. Alternatively, when a self-emitting display panel such as an organic electroluminescent image display panel is used, power consumption may be reduced by reducing the luminance of display elements.

The configuration illustrated in FIG. 1 is applied to a terminal device serving as a mobile phone terminal device having a wireless communication function. However, the configuration may also be applied to any terminal device having two display units even if it does not have a communication function.

Moreover, the configuration illustrated in FIG. 1 and FIG. 2 is applied to a physically separate display panels. However, the configuration may be applied to a display panel having two divided display areas such as first and second display areas. Then on and off of display are controlled in accordance with whether the gaze point is located on the first display area or the second display area.

In the embodiment described above, the gaze point is detected on the basis of the position of the face of the user picked up by a camera. However, the gaze point of the user may be detected by other processing. For example, the direction of the line of sight may be detected by an image picked up by a camera and the gaze point may be detected on the basis of the detected direction.

Furthermore, any available terminal device having a camera or the like capable of detecting a gaze point may be installed with application software which executes processing of the above embodiment so as to similarly function as a dedicated terminal device. When the terminal device has a communication function, the application software may be downloaded to the device using the communication function. When the terminal device does not have a communication function, the application software may be stored in a storage medium such as a memory card and then transferred to the terminal device.

It should be understood by those skilled in the art that various modifications, combinations, sub-combinations and alterations may occur depending on design requirements and other factors insofar as they are within the scope of the appended claims or the equivalents thereof.

What is claimed is:

1. A terminal device comprising:
   a display unit having a first display area and a second display area the first display area being distinguished from the second display area by a vertical or horizontal axis;
   a detection unit configured to detect as a viewing state a center of a face of a user relative to the vertical or horizontal axis of the display areas, the viewing state being a state in which the first display area and/or the second display area are being viewed; and
   a control unit configured to
   activate the first display area to a display state, but remove a backlight from the second display area, when the detection unit detects that the viewing state is only for the first display area by detecting that the center of the face is positioned more than a predetermined amount toward the first display area relative to the vertical or horizontal axis,
   activate the second display area to the display state, but remove the backlight to the first display area, when the detection unit detects that the viewing state is only for the second display area by detecting that the center of the face is positioned more than a predetermined amount toward the second display area relative to the vertical or horizontal axis, and
   switch activation between the first display area and second display area when the detection unit detects a switch in the viewing state.

2. The terminal device of claim 1, wherein:
   the control unit is further configured to simultaneously activate the first display area and the second display area when the viewing state is detected as being for both the first display area and the second display area.

3. The terminal device of claim 1, wherein:
   the display unit has a first display panel that contains the first display area, and a second display panel that contains the second display area; and
   said control unit controls respective backlighting for said first display panel and said second display panel when actuating the first display panel and the second display panel.

4. The terminal device of claim 1, wherein:
   said display unit including a touch-panel display, and
   said control unit controls a touch driver according to the viewing state.

5. The terminal device of claim 4, wherein:
   said control unit is configured to present content in a book format, and said touch driver actuates a page turning operation.

6. The terminal device of claim 1, wherein:
   the control unit is configured to display a first software application on the first display area, and subsequently display another aspect of the software application when the viewing state is detected to change to the second display area.

7. The terminal device of claim 1, wherein:
   said display unit is one common display in which said first display area and second display areas are subareas.

8. The terminal device of claim 1, wherein:
   said first display area and second display area are left and right display areas relative to a vertical center line.

9. The terminal device of claim 1, wherein:
   said first display area and second display area are up and down display areas relative to a horizontal center line.

10. The terminal device of claim 1, further comprising:
    a non-transitory computer readable storage device configured to hold downloaded instructions that when executed by a processor implement the control unit.

11. A display method for a terminal device, comprising:
    detecting as a viewing state a center of a face of a user relative to the vertical or horizontal axis of display areas, the viewing state being a state in which a first display area of a display unit and/or a second display area of the display unit are being viewed, the first display area being distinguished from the second display area by a vertical or horizontal axis; and
    automatically activating with a processor the first display area to a display state, but removing a backlight from the second display area, when the detection unit detects that the viewing state is only for the first display area by detecting that the center of the face is positioned more than a predetermined amount toward the first display area relative to the vertical or horizontal axis,
    automatically activating the second display area to the display state, but removing the backlight to the first display area, when the detecting step detects that the viewing state is only for the second display area by detecting that the center of the face is positioned more than a predetermined amount toward the second display area relative to the vertical or horizontal axis, and
    switching activation between the first display area and second display area when the detecting step detects a switch in the viewing state.

12. The method of claim 11, further comprising:
    simultaneously activating the first display area and the second display area when the viewing state is detected as being for both the first display area and the second display area.

13. The method of claim 11, wherein said automatically activating steps include controlling backlighting of display panels of the display unit.

14. The method of claim 11, wherein:
    said switching activation includes controlling a touch driver of a touch-panel display according to the viewing state, and further including
    presenting content in a book format, wherein
    said touch driver actuates a page turning operation.

15. The method of claim 11, further comprising:
    displaying a first software application on the first display area and displaying subsequently another aspect of the software application when the detecting step detects a change in viewing state.

16. The method of claim 11, further comprising:
    downloading and storing computer readable instructions into a non-transitory computer readable medium, and
    executing said computer readable instructions to perform the automatically activating steps and the switching activation step.

17. A non-transitory computer readable storage device having instructions that when executed by a processor perform steps comprising:
    detecting as a viewing state a center of a face of a user relative to the vertical or horizontal axis of the display areas, the viewing state being a state in which a first display area of a display unit and/or a second display area of the display unit are being viewed the first display area being distinguished from the second display area by a vertical or horizontal axis;
    automatically activating with a processor the first display area to a display state, but removing a backlight from the second display area, when the detection unit detects that the viewing state is only for the first display area by detecting that the center of the face is positioned more than a predetermined amount toward the first display area relative to the vertical or horizontal axis;
    automatically activating the second display area to the display state, but removing the backlight to the first display area, when the detecting step detects that the viewing state is only for the second display area by detecting that the center of the face is positioned more than a predetermined amount toward the second display area relative to the vertical or horizontal axis; and
    switching activation between the first display area and second display area when the detecting step detects a switch in the viewing state.

18. The non-transitory computer readable storage device of claim 17, further comprising:
    simultaneously activating the first display area and the second display area when the viewing state is detected as being for both the first display area and the second display area.

19. The non-transitory computer readable storage device of claim 17, wherein:
    said switching activation includes controlling a touch driver of a touch-panel display according to the viewing state; and
    presenting content in a book format and said touch driver actuating a page turning operation.

20. The non-transitory computer readable storage device of claim 17, further comprising:
    displaying a first software application on the first display area and displaying subsequently another aspect of the software application when the detecting step detects a change in viewing state.

* * * * *